(12) United States Patent
Benoit et al.

(10) Patent No.: US 7,856,900 B2
(45) Date of Patent: Dec. 28, 2010

(54) ACTUATING CYLINDER WITH SENSOR ASSOCIATED WITH ITS ROD

(75) Inventors: Laurent Benoit, La Chavanne (FR); Jean-Pierre Grattier, St-Alban Leysse (FR); Pascal Hude, Metz-Tessy (FR)

(73) Assignee: Transrol, Chambery (FR)

( * ) Notice: Subject to any disclaimer, the term of this patent is extended or adjusted under 35 U.S.C. 154(b) by 897 days.

(21) Appl. No.: 11/103,351

(22) Filed: Apr. 11, 2005

(65) Prior Publication Data

US 2006/0101929 A1    May 18, 2006

(30) Foreign Application Priority Data

Apr. 14, 2004  (FR) .................................. 04 03859

(51) Int. Cl.
*F16H 29/02* (2006.01)

(52) U.S. Cl. .................................... 74/89.34; 74/89.23

(58) Field of Classification Search ................ 74/89.34, 74/89.35, 89.38; 254/102, DIG. 2, 424, 425; 310/80, 12, 13
See application file for complete search history.

(56) References Cited

U.S. PATENT DOCUMENTS

| 5,370,011 | A  | * | 12/1994 | Gilges et al. ................... 74/89 |
| 5,557,154 | A  | * | 9/1996  | Erhart ........................... 310/80 |
| 5,634,373 | A  | * | 6/1997  | Cuffe et al. ................. 74/89.42 |
| 6,450,006 | B1 | * | 9/2002  | Dougherty .................... 73/19.1 |
| 6,767,115 | B2 | * | 7/2004  | Blackwelder ................ 362/385 |
| 7,123,982 | B2 | * | 10/2006 | Mauer et al. ................. 700/175 |
| 2002/0162410 | A1 | * | 11/2002 | Zimmerman ............... 74/89.35 |
| 2003/0233896 | A1 | * | 12/2003 | Nagai et al. ................ 74/89.23 |
| 2005/0160846 | A1 | * | 7/2005  | Chiang ....................... 74/89.35 |

* cited by examiner

*Primary Examiner*—Richard W Ridley
*Assistant Examiner*—Alan B Waits
(74) *Attorney, Agent, or Firm*—Meyertons, Hood, Kivlin, Kowert & Goetzel, P.C.; Eric B. Meyertons

(57) ABSTRACT

Actuating cylinder including a longitudinal cylinder body, a longitudinal cylinder rod traversing a front transverse wall of the cylinder body and a longitudinal means of operating the cylinder rod relative to the cylinder body, the cylinder body including a rear transverse wall situated at a distance from a rear end of the cylinder rod inside the body. The cylinder includes a sensor supported by a front end portion of the cylinder rod; longitudinally deformable linking means to delimit a longitudinal channel of variable length coupling the front end portion of the cylinder rod and the rear transverse wall of the cylinder body and emerging at the rear of this rear transverse wall; and at least one electric connecting wire which is connected to the sensor, which extends in the longitudinal channel and which emerges via the rear end of this longitudinal channel.

13 Claims, 2 Drawing Sheets

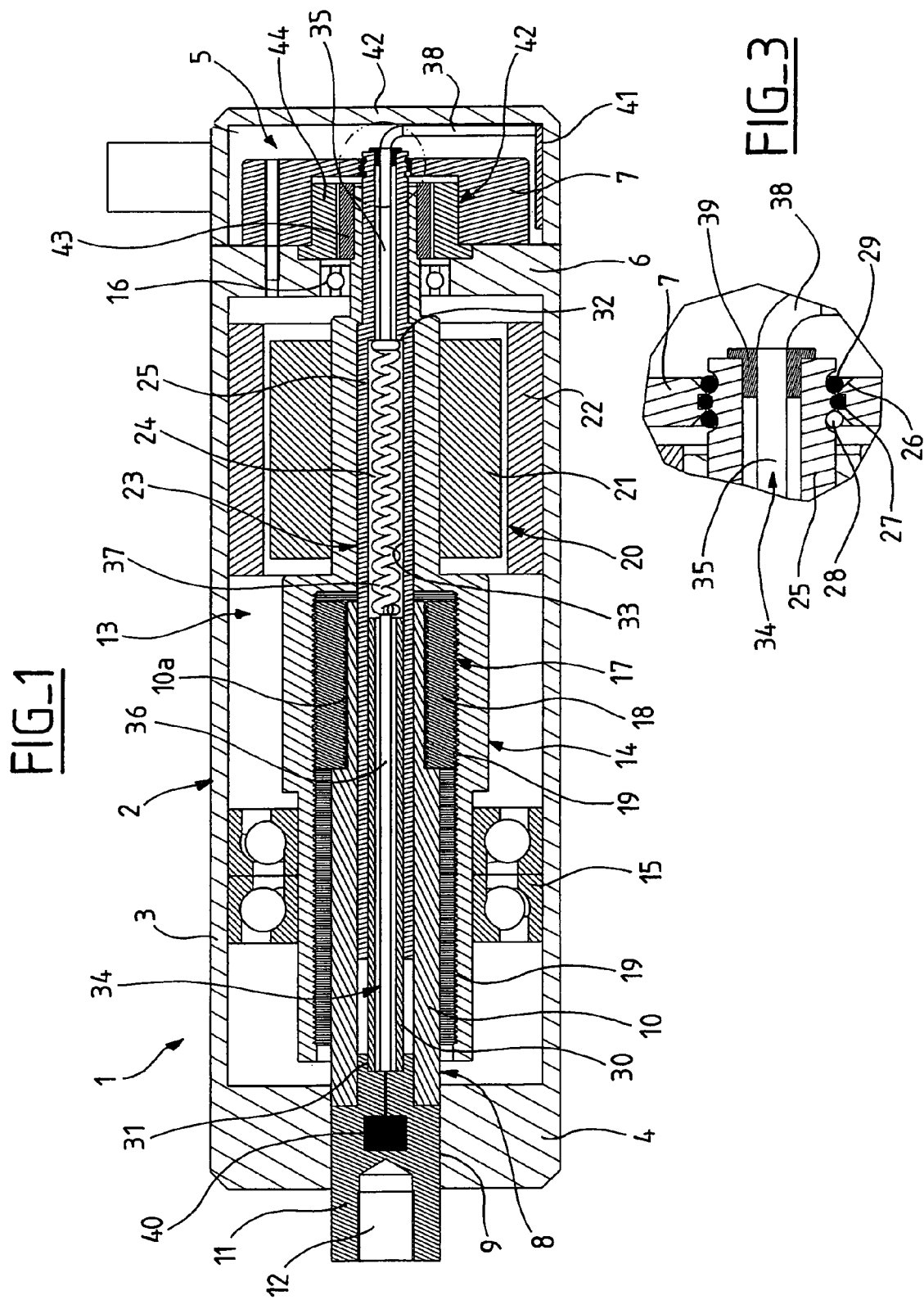

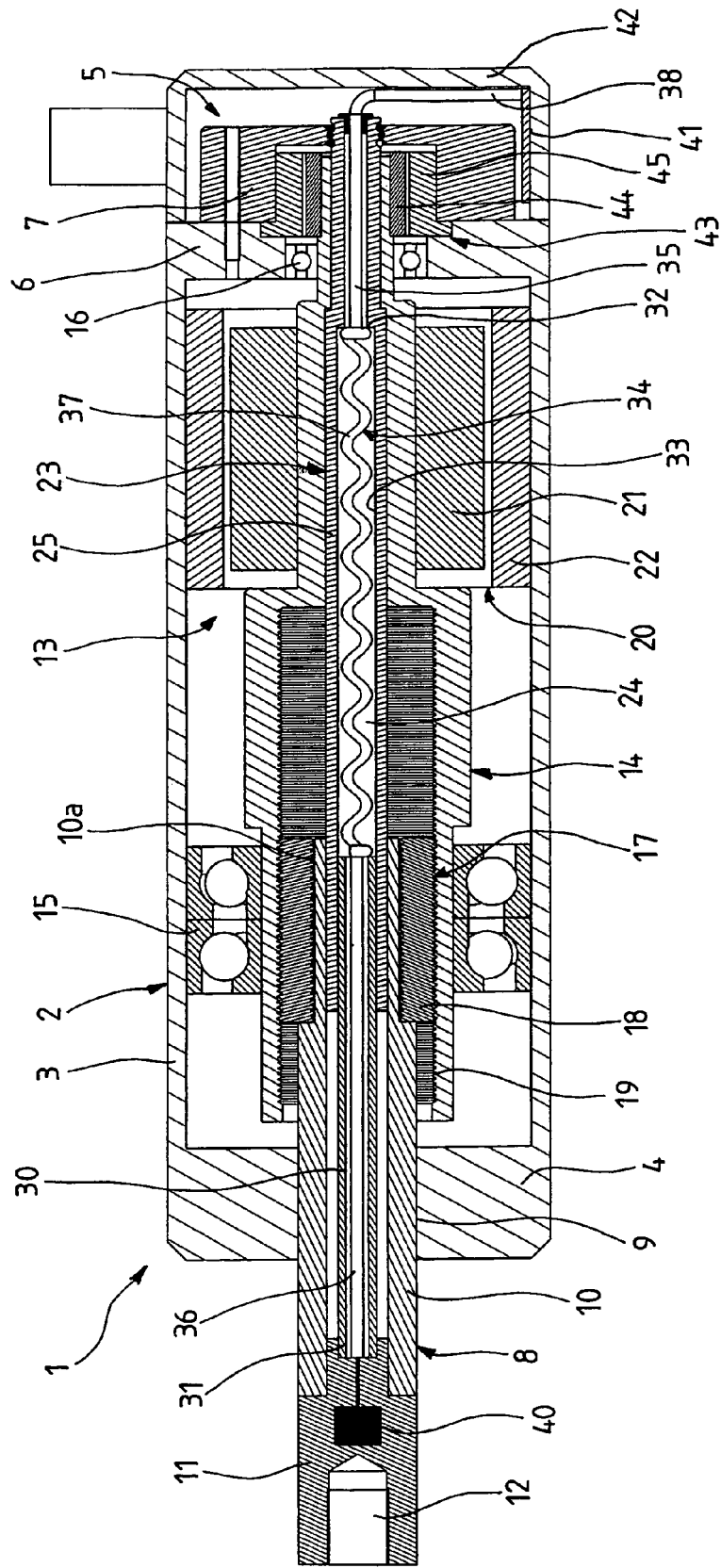
FIG_2

ACTUATING CYLINDER WITH SENSOR ASSOCIATED WITH ITS ROD

FIELD OF THE INVENTION

The present invention relates to the field of actuating cylinders, in particular the field of electric cylinders comprising a worm-and-nut operating means with rollers and with integrated electric motor.

SUMMARY OF THE INVENTION

In an embodiment, actuating cylinders are fitted with a sensor. In particular a sensor of pressure is applied to the cylinder rod of an actuating cylinder.

The actuating cylinder includes a longitudinal cylinder body, a longitudinal cylinder rod traversing a front transverse wall of the cylinder body and a longitudinal means of operating the cylinder rod relative to the cylinder body, the cylinder body including a rear transverse wall situated at a distance from a rear end of the cylinder rod inside the body.

In an embodiment, the cylinder includes a sensor supported by a front end portion of the cylinder rod; longitudinally deformable linking means to delimit a longitudinal channel of variable length connecting the front end portion of the cylinder rod and the rear transverse wall of the cylinder body and emerging at the rear of this rear transverse wall; and at least one electric connecting wire which is connected to the sensor, which extends in the longitudinal channel and which exits via the rear end of the longitudinal channel.

In an embodiment, the electric connecting wire preferably has, in the longitudinal channel, at least one portion rolled up in the form of a coil.

In an embodiment, the longitudinal channel preferably has a longitudinal portion of increased section in which extends the portion of the electric connecting wire rolled up in the form of a coil.

In an embodiment, means are preferably provided for holding the wire in the rear portion of the longitudinal channel.

In an embodiment, the front-end portion of the cylinder rod includes a fitted connection head.

In an embodiment, the linking means includes at least two tubular longitudinal portions mounted telescopically.

In an embodiment, the linking means includes a first longitudinal tube attached to the front end portion of the cylinder rod and a second longitudinal tube attached to the rear transverse wall, these tubes being mounted telescopically.

In an embodiment, the first tube is engaged in the second tube, the cylinder rod including a longitudinal tubular wall in which the second tube is engaged.

In an embodiment, the longitudinal tube receiving internally the other longitudinal tube has a shoulder at a distance from the end of this other tube, so as to determine, between this shoulder and this end, a longitudinal portion of increased section, the electric connecting wire having, in this portion of increased section, a portion rolled up in the form of a coil.

In an embodiment, the linking means may advantageously include a tubular wall of the cylinder rod and at least one longitudinal tube coupled to the rear transverse wall and coupled telescopically to the tubular wall of the cylinder rod.

In an embodiment, the longitudinal operating means includes rollers with externally threaded portions engaged on the one hand with an externally threaded portion of the cylinder rod and an internally threaded portion of a longitudinal sleeve and an electric motor whose rotor is supported by the sleeve and the stator is supported by the cylinder body.

In an embodiment, the threaded portions are such that the rollers move longitudinally with the cylinder rod.

BRIEF DESCRIPTION OF THE DRAWINGS

The present invention will be better understood on studying an actuating cylinder described as a non-limiting example and illustrated schematically by the drawing in which:

FIG. 1 represents a longitudinal section of a cylinder according to the invention, in a retracted or in position;

FIG. 2 represents a longitudinal section of the cylinder of FIG. 1, in an advanced or out position;

FIG. 3 represents an enlarged detail of the cylinder.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The actuating cylinder 1 shown in the figures includes a cylinder body 2 which has a tubular longitudinal wall 3 and, at the ends of this wall, a front transverse wall 4 and a rear transverse wall 5 including an internal annular portion 6 projecting into the longitudinal wall 3 and a rear fitted ring 7.

The cylinder 1 includes a longitudinal cylinder rod 8 which extends through a passage 9 of the front transverse wall 4 of the body 2 and which includes a tubular longitudinal portion 10 whose rear end is at a distance from the rear wall 5 of the body 2 and a front portion of the same diameter including a fitted connection head 11 attached to this portion 10 for example by screwing into its bore, this head having for example a threaded frontal recess 12 for the purpose of coupling it to a non-rotating mechanism to be actuated.

The cylinder 1 also includes an integrated operating means 13 made up in the following manner. This operating means 13 includes a longitudinal sleeve 14 which is mounted in the body 2 via a front ball bearing 15 associated with the front portion of the longitudinal wall 3 of the body 2 and a rear ball bearing 16 associated with the annular portion 6 of the transverse wall 5 of this body, such that this sleeve 14 is held longitudinally.

The operating means 13 also includes a worm-and-nut system 17 interposed between the rod 8 and the sleeve 14.

This system 14 includes a multiplicity of longitudinal rollers 18 with externally threaded portions, engaged with an externally threaded rear portion 10a of the tubular longitudinal portion 10 of the rod 8 and with an internally threaded front internal portion 19 of the longitudinal sleeve 14.

In a manner known per se, the aforementioned threaded portions are such that when the sleeve is rotated, the rod 8 moves longitudinally relative to the body 2 and the rollers 18 follow the longitudinal movements of this rod 8.

To rotate the sleeve 14, the operating means 13 also includes an electric motor 20 whose annular rotor 21 is mounted peripherally on a portion of the sleeve 14 adjacent to the rear transverse wall 5 of the body 2 and whose stator 21 is mounted inside the portion of the body 2 adjacent to this rear wall 5.

The cylinder 1 also includes linking means 23 that are longitudinally deformable and suitable for delimiting a longitudinal channel 24 of variable length coupling the head 11 of the rod 8 and the rear transverse wall 5 of the body 2 and emerging at the rear of this wall.

The linking means 23 includes a cylindrical longitudinal tube 25 whose front portion is engaged slidingly and coupled telescopically in the tubular longitudinal portion 10 of the rod 8 and whose rear end portion traverses a passage 26 of the rear ring 7 of the rear transverse wall 5 and is attached longitudinally and in rotation to the latter, such that the longitudinal tube 25 extends, between its aforementioned portions, preferably with clearance, through the longitudinal sleeve 14.

For the aforementioned attachment, in the example represented more particularly in FIG. 3, an annular seal 27 is forcibly interposed into the passage 26, between the ring 7 and the longitudinal tube 25, and is engaged in the annular grooves of the latter. Furthermore, elastic annular retaining rings 28 and 29 are engaged in peripheral grooves of the longitudinal tube 25, situated on either side of the annular seal 27, and interacting with the ring 7 on either side of the passage 26.

The linking means 23 also includes a cylindrical longitudinal tube 30 whose rear portion is engaged slidingly and coupled telescopically in the front portion of the longitudinal tube 25 and whose front end portion is engaged and attached in a rear recess 31 of the head 11 and attached in this recess for example by force-fitting.

The longitudinal tube 25 has an internal annular shoulder 32 situated at a distance from the rear end of the longitudinal tube 30 such that a longitudinal space 33 of increased diameter is made between this shoulder 32 and this end.

The result of the foregoing is that, when the rod 8 moves longitudinally, the front end portion of the longitudinal tube 25 slides longitudinally, telescopically, in the space separating the tubular longitudinal portion 10 of this rod 8 and the longitudinal tube 30. Thus, the telescopic longitudinal tubes 25 and 30 determine the variable length longitudinal channel 24, the space 33 of increased diameter also being of variable length.

In the longitudinal channel 24 is installed a sheathed electric connecting wire 34, with at least one strand, which has a rear rectilinear portion 35 extending in the rear portion of the longitudinal tube 25 and whose front end is attached to the head 11 of the longitudinal rod 8 for example by bonding or crimping, a rectilinear portion 36 extending in the longitudinal tube 30 and a mid-portion 37 extending in the space 33 of increased diameter and rolled up in the form of a coil. The electric connecting wire 34 exits via the rear end of the longitudinal channel 24 and has a portion 38 external to this channel 24.

To hold the rear portion of the electric connecting wire 34, a cable gland or annular seal 39 is for example interposed between this wire 34 and the rear portion of the longitudinal tube 25.

The front end of the wire 34 is connected electrically to a sensor 40 integrated by any means into the head 11 of the longitudinal rod 8 and shown schematically, for example to a sensor of pressure applied to this rod 8 and the rear end of this wire 34 is for example electrically connected to an electronic circuit 41 installed in a rear cap 42 attached to the rear of the body 2 and shown schematically.

The result of the foregoing is that, when the longitudinal rod 8 moves longitudinally, the portions 35 and 38 of the electric connecting wire 34 secured to the longitudinal tube 25 remain immobile, its portion 36 secured to the head 11 follows the movements of the longitudinal rod 8 and its rolled up portion 37 lengthens or shortens depending on the direction of movement of the longitudinal rod 8, this portion 37 being shortened in FIG. 1 and lengthened in FIG. 3.

Thus, the electric information items originating from the sensor 40 may be transmitted to the electronic circuit 41 via the variable length electric connecting wire 34, which extends in the variable length longitudinal channel 24 such that it is in contact only with the longitudinally mobile portions of the cylinder constituted by the telescopic tubes 25 and 30 and which is protected from the rotating portions of the cylinder, in particular from the rotating sleeve 14.

Furthermore, the cylinder 1 is fitted with a sensor 43 of angular position whose rotor 44 is supported by the rear portion of the longitudinal sleeve 14 and whose stator 45 is supported by the ring 7 of the rear wall 5, in front of the passage 26 of this ring 7 and behind the bearing 16.

Furthermore, the cylinder 1 has, amongst other things and in a manner known per se, means of electrically connecting the motor 20, the electronic circuit 41 and the sensor 43, which are not shown in the drawing.

The present invention is not limited to the example described above.

In particular, the worm-and-nut with rollers operating means could be replaced by any known means of transforming a rotary movement into a translation movement of the cylinder rod relative to the cylinder body.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. An actuating cylinder comprising:
    a longitudinal cylinder body;
    a longitudinal cylinder rod traversing a front transverse wall of the cylinder body, the cylinder body comprising a rear transverse wall situated at a distance from a rear end of the cylinder rod inside the body;
    a longitudinal sleeve coupled to the cylinder body and located therein;
    a driving means of operating longitudinally the cylinder rod relative to the cylinder body located radially between the sleeve and the cylinder rod;
    a sensor supported by a front end portion of the cylinder rod;
    a longitudinally deformable tubular linking means, comprising at least two tubular longitudinal portions mounted in telescopic relation to one another, to delimit a longitudinal channel of variable length, the linking means having at least one portion coupled to the front end portion of the cylinder rod and at least one other portion coupled to the rear transverse wall of the cylinder body and the channel emerging at the rear of this rear transverse wall;

at least one electric connecting wire which is coupled to the sensor and which extends in the longitudinal channel of variable length backwards so as to emerge at the rear of the rear transverse wall; and an electric motor whose rotor is supported by the sleeve and whose stator is supported by the cylinder body.

2. The cylinder according to claim 1, wherein the electric connecting wire has, in the longitudinal channel, at least one portion rolled up in the form of a coil.

3. The cylinder according to claim 1, wherein the longitudinal channel has a longitudinal portion of increased section in which extends the portion of the electric connecting wire rolled up in the form of a coil.

4. The cylinder according to claim 1, further comprising means for holding the wire in the rear portion of the longitudinal channel.

5. The cylinder according to claim 1, wherein the front end portion of the cylinder rod comprises a fitted connection head.

6. The cylinder according to claim 1, wherein the longitudinally deformable linking means comprise a first longitudinal tube attached to the front end portion of the cylinder rod and a second longitudinal tube attached to the rear transverse wall, these tubes being mounted telescopically.

7. The cylinder according to claim 6, wherein the first tube is engaged in the second tube, the cylinder rod comprising a longitudinal tubular wall in which the second tube is engaged.

8. The cylinder according to claim 6, wherein one of the first or the second longitudinal tube receiving internally the other longitudinal tube has a shoulder at a distance from one end of this other tube, so as to determine, between this shoulder and this one end of this other tube, a longitudinal portion of increased section, the electric connecting wire having, in this portion of increased section, a portion rolled up in the form of a coil.

9. The cylinder according to claim 1, wherein the longitudinally deformable linking means comprise a tubular wall of the cylinder rod and at least one longitudinal tube coupled to the rear transverse wall and coupled telescopically to the tubular wall of the cylinder rod.

10. The cylinder according to claim 1, wherein the driving means comprises rollers with externally threaded portions engaged with an externally threaded portion of the cylinder rod and an internally threaded portion of the longitudinal sleeve.

11. The cylinder according to claim 10, wherein the threaded portions of the rollers and cylinder rod are configured such that the rollers move longitudinally with the cylinder rod.

12. The cylinder according to claim 1, wherein the deformable tubular linking means comprises a wall that defines the longitudinal channel.

13. An actuating cylinder comprising:

a longitudinal cylinder body;

a longitudinal cylinder rod traversing a front transverse wall of the cylinder body, the cylinder body comprising a rear transverse wall situated at a distance from a rear end of the cylinder rod inside the body;

a driving means of operating longitudinally the cylinder rod relative to the cylinder body located radially between the sleeve and the cylinder rod;

a sensor supported by a front end portion of the cylinder rod;

a longitudinally deformable tubular linking means, comprising at least two tubular longitudinal portions mounted in telescopic relation to one another, to delimit a longitudinal channel of variable length, the linking means having at least one portion coupled to the front end portion of the cylinder rod and at least one other portion coupled to the rear transverse wall of the cylinder body and the channel emerging at the rear of this rear transverse wall; and at least one electric connecting wire which is coupled to the sensor and which extends in the longitudinal channel of variable length backwards so as to emerge at the rear of the rear transverse wall.

* * * * *